June 30, 1936. M. D. VICKERY 2,046,225
ORNAMENTAL LAWN SPRINKLER
Filed July 28, 1934 2 Sheets-Sheet 1
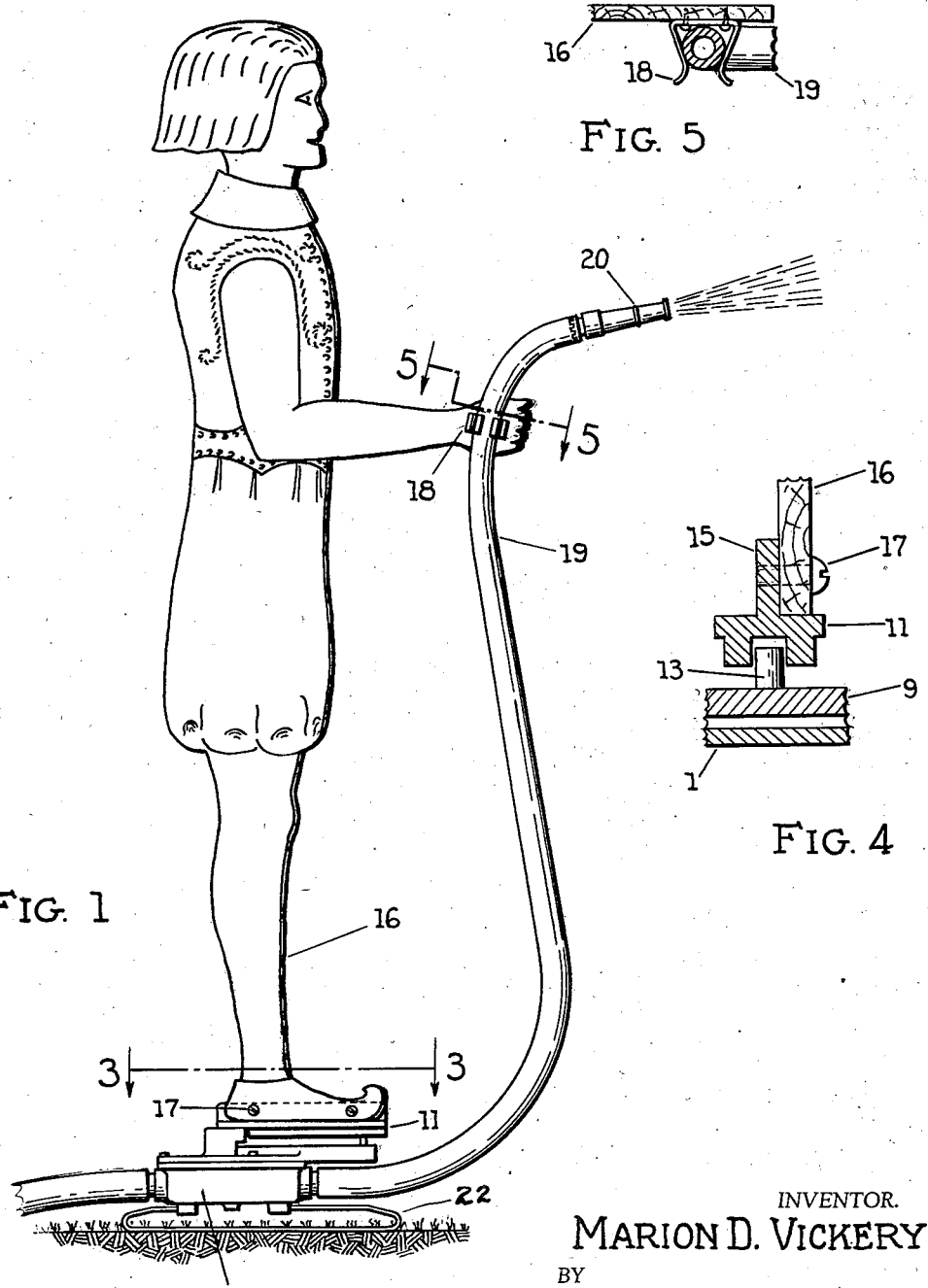
INVENTOR.
MARION D. VICKERY
BY
ATTORNEY.

June 30, 1936.  M. D. VICKERY  2,046,225

ORNAMENTAL LAWN SPRINKLER

Filed July 28, 1934  2 Sheets-Sheet 2

INVENTOR.
MARION D. VICKERY
BY
Owen H. Spencer
ATTORNEY.

Patented June 30, 1936

2,046,225

UNITED STATES PATENT OFFICE 2,046,225

ORNAMENTAL LAWN SPRINKLER

Marion D. Vickery, Peru, Ind.

Application July 28, 1934, Serial No. 737,442

1 Claim. (Cl. 299—67)

The invention is a self-distributory garden and lawn sprinkling mechanism, and is more particularly a hose nozzle automatically swung through a range of sprinkling positions through motion transmitted from a water motor and gearing operated by water en route to the sprinkling nozzle, and the invention resides substantially in the construction, combination and arrangement of elements hereinafter pointed out and recited more particularly in the claims.

It is a primary object of the invention to provide a portable water-operated motor the inlet of which communicates through a source of water under pressure, through a conventional lawn sprinkling hose, to provide a sprinkling nozzle communicating with the outlet of said motor through a section of flexible conduit, to provide a pivoted support for such nozzle, and to provide a means to oscillate said support upon its pivot together with such nozzle by motion transmitted from the water motor.

It is also a primary object to construct such nozzle support in the form of a pivoted human caricature in such manner that the nozzle appears to be held in the hand or hands of the caricature, so that said caricature is oscillated with said nozzle, directing same through a range of sprinkling positions, in attractive and entertaining resemblance to the presence and actions of a human figure.

The above and other objects are attained by the structure illustrated in the accompanying drawing in which:

Figure 1 is a side elevation of the invention under operation;

Fig. 4 is a detailed sectional view taken in the proximity of line 4—4 of Fig. 2; and, Fig. 5 is a detailed sectional view taken in the proximity of line 5—5 of Fig. 1.

Similar characters of reference designate similar parts throughout the different views.

Figure 2:
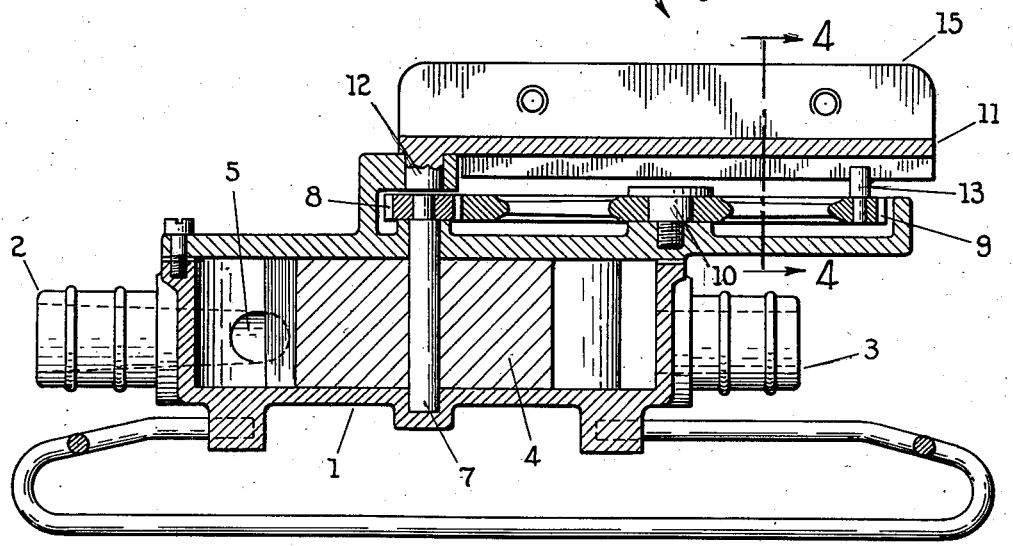
Fig. 2 is a fragmentary sectional view of the water motor, gearing and portable base of the invention, being taken from the same view point as Figure 1 and in the proximity of line 2—2 of Fig. 3.

Referring to Figure 1 and Fig. 2, the numeral 1 indicates the motor housing having the hose inlet connection 2 and the hose outlet connection 3.

The motor wheel 4 is rotated within said housing by water introduced into the housing through the hose inlet connection 2 and thence through the interiorly directed nozzle 5, which is directed at the blades 6 of said water wheel, said nozzle being directed to one side of the axial center of said wheel.

Said wheel is journaled through the upper and lower wall structure of the pump housing 1 by the vertical shaft 7 to which it is secured. The upper end of said shaft extends beyond said housing and mounts the pinion gear 8, exteriorly thereof. Said pinion gear meshes with the relatively large spur gear 9, said spur gear journaling on the shoulder screw 10, which engages said pump housing.

To one side of the spur gear 9, the arm 11 is pivoted to said pump housing by its trunnion 12, in a manner to swing over said spur gear about a vertical axis. Said arm forms a groove the open side of same being downward, and said groove thus facing said open gear.

Figure 3:
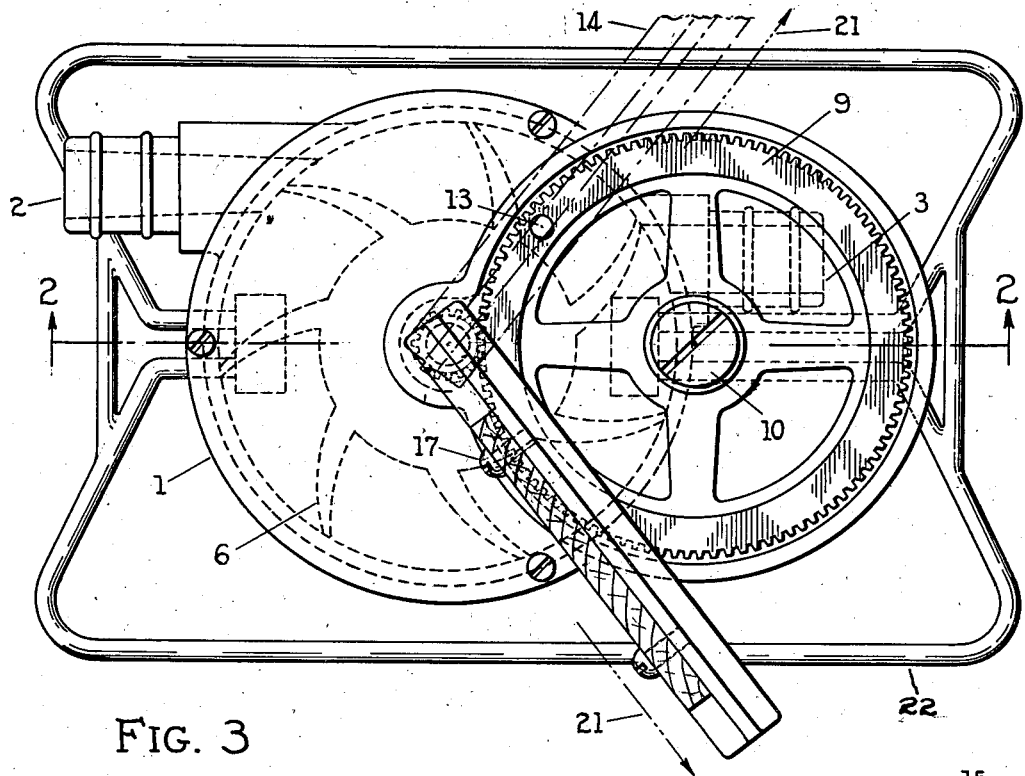
Fig. 3 is a sectional view taken in the proximity of line 3—3 of Fig. 1.

Said spur gear is provided with an upwardly extending pin 13, which engages said groove in free moving relation therein, by which arrangement it will be understood that rotation of said spur gear by the water wheel 4 through the pinion gear 8 will oscillate said arm upon its trunnion 12, said pin sliding back and forth through said groove, said arm being swung laterally and repetitiously by the thrust of said pin against the sides of said groove, from the position indicated by solid lines in Fig. 3 to the position indicated by the dot-and-dash lines 14.

The arm 11 is provided with an upwardly disposed flange 15, to which the caricature 16, is removably secured by the screws 17. In this example of the invention said caricature is conveniently cut in silhouette manner from flat material in abstract representation of a human figure, both sides of the caricature bearing a corresponding drawing of the human figure portrayed. The hand portion of said caricature is provided with a hose clamp means 18, which engages the hose section 19, in suitable manner to direct the nozzle 20 thereof forwardly, the other end of said hose section engaging the pump outlet connection 3.

From the foregoing it will be seen that oscillation of the arm 11, as above described, will accordingly oscillate the caricature 16, directing the hose nozzle 20 through a range of positions to and between the double-dot-and-dash lines 21 of Fig. 3, and that a wide range of lawn area or the like is thus sprinkled by the water which operates the water wheel 4, and thence discharges through the hose nozzle 20. It will also be obvious that by extending the hose section 19, a more or less amount from the clamp means 18, the nozzle 20, will droop a more or less amount, and the elevation of the sprinkling stream and the distance reached may thus be varied as desired by adjusting said hose section in said clamp.

The sled-like base 22 mounts the pump housing 1 and thus portably supports the device, it being convenient to slide same from one point to another, although it is understood that any suitable supporting base may be used.

It will be understood that the invention not only carries out the sprinkling operation, but that the same is attractive, ornamental and entertaining in operation; and that the hose nozzle is supported at a suitable working height without placing in view an unsightly supporting structure.

While the description and drawing illustrate in a general way a certain manner of carrying the invention into effect, it is obvious that many modifications may be made in the various details without departing from the scope of the appended claim, it being understood that the invention is not restricted to the particular example shown.

The invention claimed is:

A sprinkling mechanism comprising a movable support, a water motor mounted on the support and having inlet and outlet hose connections, a vertical standard mounted for oscillation about its axis by the action of the water motor, a hose clamp carried by the upper end of said standard, and a hose connected to the outlet connection of the water motor, said clamp being arranged for the ready insertion of the hose therein and release therefrom, whereby the hose can be used by hand or the nozzle placed in the clamp to form an automatic oscillating sprinkler.

MARION D. VICKERY.